Oct. 18, 1949.   W. W. PAGET   2,484,849
HEATING APPARATUS OF THE FLUID
ACTUATED FUEL PUMP TYPE
Original Filed April 9, 1943
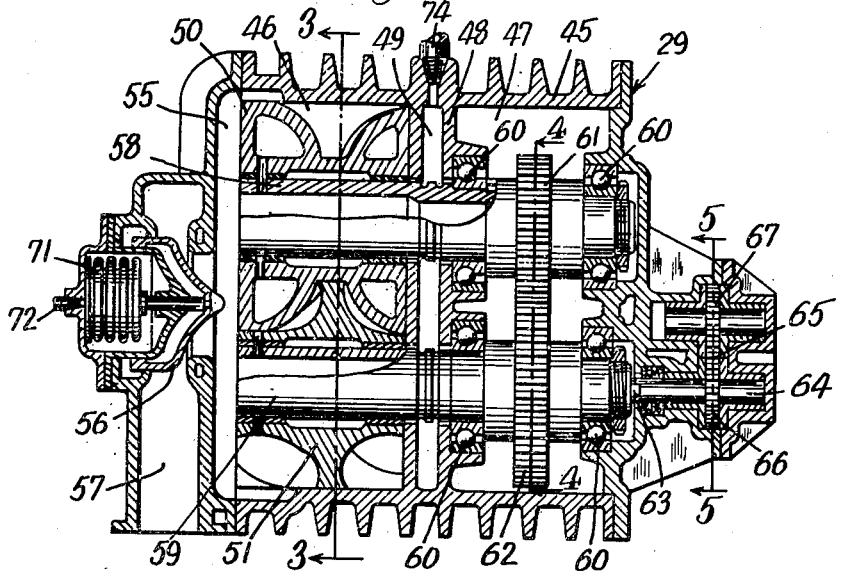
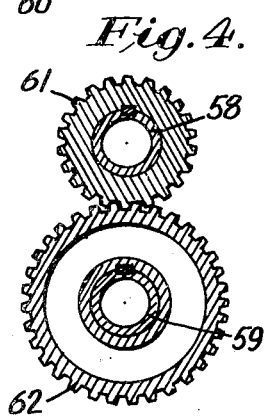
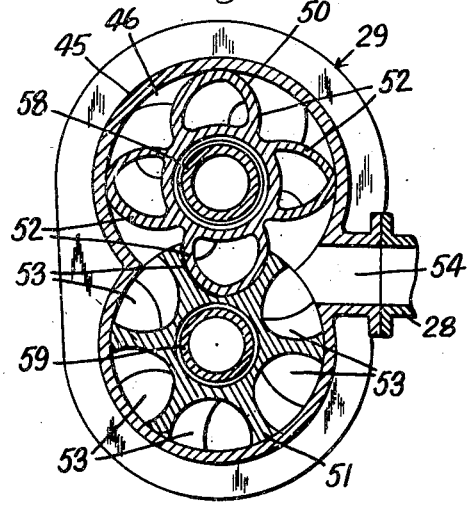
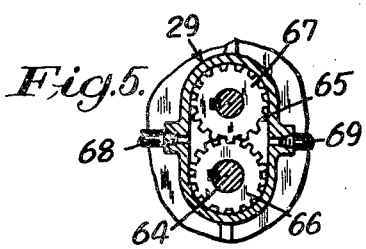
Inventor:
Win W. Paget
by Louis A. Maxson,
Atty.

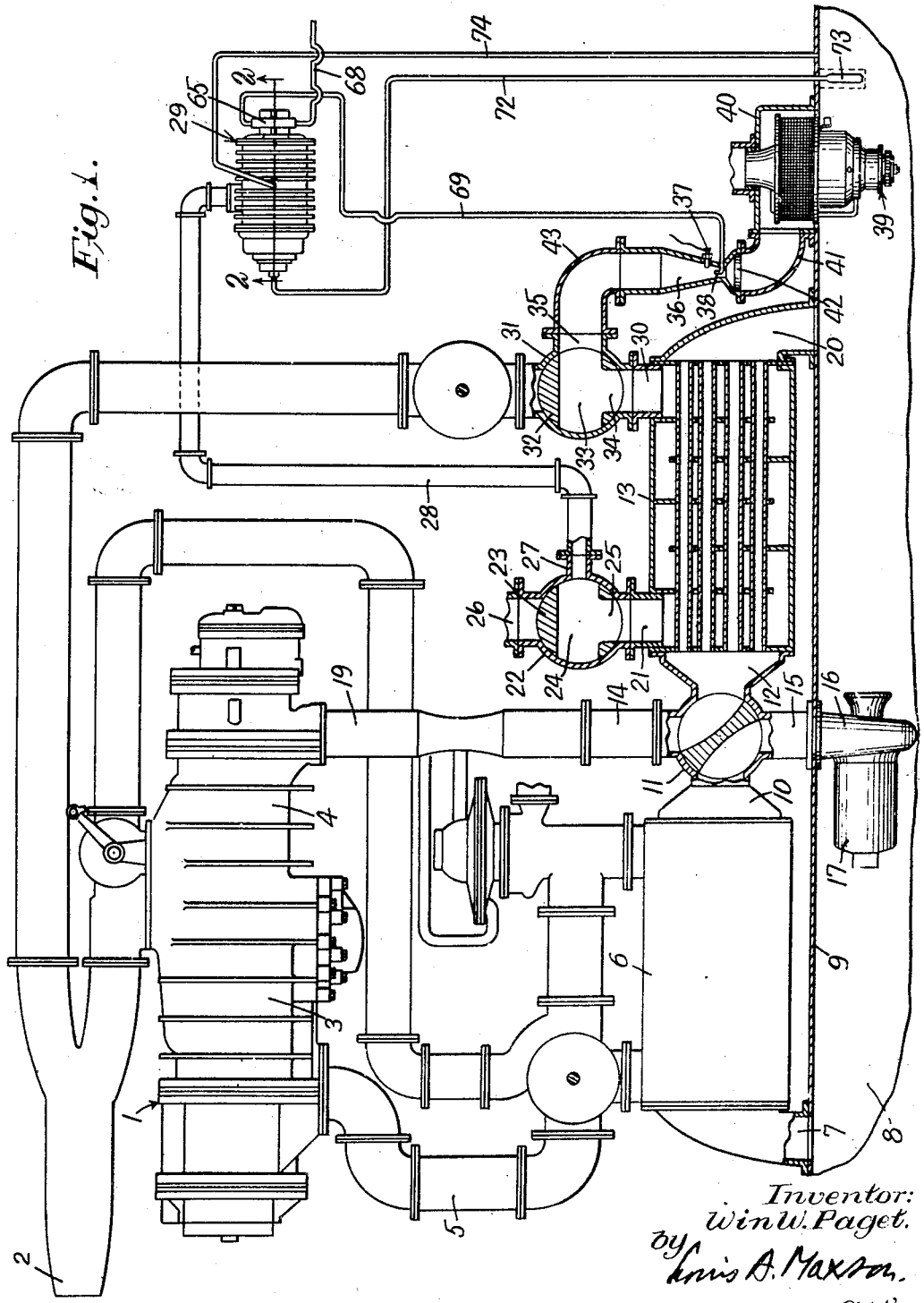

Patented Oct. 18, 1949

2,484,849

UNITED STATES PATENT OFFICE 2,484,849

HEATING APPARATUS OF THE FLUID ACTUATED FUEL PUMP TYPE

Win W. Paget, Michigan City, Ind., assignor to Joy Manufacturing Company, a corporation of Pennsylvania Original application April 9, 1943, Serial No. 482,422. Divided and this application November 23, 1944, Serial No. 564,855

7 Claims. (Cl. 237—33)

My invention relates to an improved fuel pump, and more particularly to an improved fuel pump which is especially adapted, because of certain features of its construction, to use in the aircraft cabin pressure conditions controlling field.

An object of my invention is to provide an improved pumping apparatus especially adapted for pumping fuel for use in heating an aircraft cabin and so constructed that cabin air may be utilized to provide a sealing zone to prevent the escape of fluid from one portion of the apparatus to another. Another object of my invention is to provide for a pump operated by a fluid actuated motor for supplying fuel to heat an aircraft cabin, a zone pressurized by cabin air for preventing the escape of fluid from the motor to other portions of the apparatus. Yet another object is to provide with a pump operating to supply fuel to heat the cabin of an aircraft and driven by a motor actuated by the products of combustion, a chamber pressurized by cabin air for preventing the escape of gases from the motor to other portions of the apparatus. Still another object is to provide for a motor having rotors supported by bearings, improved means for preventing the escape of operating fluid from the motor to the bearings. Yet another object is to provide for a fluid actuated motor having rotors supported by bearings, a chamber arranged between the motor and the bearings, and means for maintaining in said chamber a pressure at least as high as the pressure in said motor. These and other objects and advantages of the invention will, however, hereinafter more fully appear.

This application is a division of my copending application Serial No. 482,422, filed April 9, 1943, now Patent No. 2,444,951, issued July 13, 1948.

In the accompanying drawings there is shown for purposes of illustration one form which the invention may assume in practice.

In these drawings:

Fig. 1 is a generally diagrammatical view showing a cabin pressurizing system with which an illustrative form of the invention is associated, parts being shown in elevation and other parts in section.

Fig. 2 is an enlarged horizontal sectional view on the plane of the line 2—2 of Fig. 1.

Fig. 3 is a vertical sectional view on the plane of the line 3—3 of Fig. 2, through the air motor end of the unit shown in Fig. 2.

Fig. 4 is a section on the plane of line 4—4 of Fig. 2, showing the timing gears.

Fig. 5 is a sectional view on the plane of the line 5—5 of Fig. 2, through the fuel pump.

Referring first to Fig. 1, illustrating the cabin pressurizing system with which the illustrative embodiment of the invention is associated, it will be observed that a multi-stage supercharger or air compressor 1 has an air inlet 2 and is provided with a first or primary stage 3 and a second stage 4. The low pressure or primary stage 3 of the supercharger has its discharge connected to a discharge conduit 5 which leads to a heat exchanger 6, the latter being connected by a passage 7, with the interior space 8 of the aircraft cabin 9 to be pressurized and heated. The other end of the heat exchanger is connected as at 10 to a valve device 11 which is adapted to connect the connection 10 and a diametrically opposite connection 12 associated with another heat exchanger 13, selectively with a conduit 14 or a conduit 15, the last two conduits being diametrically opposite each other with respect to the valve device 11. The conduit 14 constitutes a portion of the discharge conduit or line for the second stage 4 of the supercharger and the conduit 15 being connected to the discharge volute 16 of a suitably motor driven air circulator 17 arranged within the cabin space 8. The conduit 14 is connected with the second stage discharge of the supercharger by way of a conduit 19. The heat exchanger 13 is connected as at 20 with the interior of the cabin. The heat exchanger 13 is connected at its left-hand end through a conduit 21 with a valve casing 22 in which there is rotatably supported a valve element 23 having a diametrically extending passage 24 and a right angle branch 25 communicating with the passage 24 at the latter's central portion. The valve casing 22 is connected to atmosphere by a passage 26 and the casing 22 communicates with the passage 26 at a point diametrically opposite from the conduit 21 and also has a connection 27 at right angles to the axial line of the passages 21 and 26 and facing towards the right in Fig. 1. The connection 27 is connected by a conduit 28 with the improved fuel pumping unit generally designated 29, to be later described in detail. The right-hand end of the heat exchanger 13 communicates through a passage 30 with a valve casing 31 in which there is rotatably mounted a three-way valve element 32 having a diametrically extending passage 33 and a branch passage 34 at right angles to and communicating with the passage 33 at the central portion of the latter. The valve casing 31 has at its right-hand side a connection as at 35 at right angles to the axial line of the connection 30 with a combustion chamber 36 which is provided with an igniter in the form of a spark plug 37 and with a fuel nozzle 38 to which fuel (gasoline) is supplied from the fuel pumping unit 29. A cabin vent valve device, generally designated 39, is enclosed by a housing 40, and the interior of this housing is connected by a conduit 41 through a screen 42 with the combustion chamber 36. The cumbustion chamber 36 is connected by a conduit 43 through the connection 35 with the valve casing 31. As the system with which the improved heater means is associated is fully described in the copending application Serial No. 482,422, further description thereof herein is therefore unnecessary.

The fuel pumping unit 29, shown in Figs. 1 and 2, comprises a casing 45 divided into two chambers 46 and 47 by an intermediate hollow partition 48 having a chamber 49 therein. The chamber 46 is in the form of a pair of cylinders (see also Fig. 3) which overlap with each other along a chord of approximately 90° of arcuate extent, thus providing a casing for a pair of rotors 50 and 51. The rotor 50 is lobed, and has four helically shaped lobes 52. The rotor 51 has six helically shaped grooves 53 for receiving the lobes 52. These rotors are adapted to operate with space packing, both with respect to each other and with respect to the bores in which they turn; and operating medium is adapted to be admitted through a passage 54 to said rotors adjacent the partition 48 at points where the grooves and lobes coact to form pockets which increase in volume as the rotors turn. The opposite ends of the rotors, their ends more remote from the partition 48, are in free communication with a common exhaust chamber 55 connected, under the control of a thermostatically controlled valve 56 with a passage 57 leading to the atmosphere. The spiral angle of the rotors is desirably such that the operating fluid does not work expansively in the motor, but instead, approximately as each working space comprised in part of volumes included between lobes and within grooves has communication established, at the outer ends of the rotors, with the discharge space 55, these working spaces leave communication with the inlet. The rotors are each mounted on shafts, the shaft for the rotor 50 being designated 58 and the shaft for the rotor 51 being designated 59, and the bearings for these shafts are located only in the chamber 47 in which, as may be observed, there are provided multiple ball bearings 60 for rotatably supporting each shaft. Each shaft has fixed to it between the ball bearings 60 a gear, the shaft 58 carrying a gear 61 and the shaft 59 carrying a gear 62. These gears are timing gears and maintain the correct angular relations between the rotors, so as to prevent their running in contact with each other. The shaft 59 has a clutch 63 connecting it to the drive shaft 64 of a gear type gasoline pump 65. This gasoline pump has intermeshing pump gears 66 and 67, the latter driven by the former, and fuel delivered to the pump intake from any suitable source (not shown) through a conduit 68, Fig. 1, is carried around by the teeth of the pump gears and delivered to a conduit 69 which leads to the nozzle 38. The displacement of the pump 65 is designed in such a manner that the gasoline delivered by the pump will be in suitable volume for combustion by the air which flows from the cabin past the vent valve device 39 to the combustion space 36 through the conduit 41. The valve 56 has its position regulated by a thermostatic control mechanism including a bellows 71, a conduit 72 and a thermostatic control device 73 in the cabin. Now it will be observed with respect to this arrangement that the combustion products produced by the burning of the gasoline in the combustion chamber 36 pass through the heat exchanger 13 and through the conduit 28 and operate the rotors of the motor which drives the fuel pump, and the valve 56 controls the exhaust from these rotors to atmosphere, and, by more or less opening or closing the communication with the exhaust, the speed of operation of the pump operating motor will be regulated in accordance with the cabin temperature variations. It will be observed that the chamber 49 within the partition 48 is continuously connected by conduit 74 with the interior of the cabin, and the conduit 74 and the chamber 49 perform the important function of preventing any possible escape of the combustion products into the space 47 in which the bearings for the rotor shafts are arranged.

The mode of operation of the improved heating device will be easily understood from what has been said. The operating fluid for effecting drive of the rotors 50 and 51 of the pump driving motor is derived, most of the time, from the combustion products produced by burning of gasoline in the combustion chamber 36 and is delivered from the heat exchanger 13 through the conduit 28 to the motor intake 54. Air flow caused by the difference between cabin and ambient pressures will start the motor though there be no combustion when the valves 23 and 32 have just been moved to the positions shown in Fig. 1. Having operated the rotors and driven the gasoline pump, the fluid passes from the motor through the exhaust space 55 and under the control of the valve 56 through the exhaust passage 57 to atmosphere. The air which is used to operate the gasoline heater is delivered through the conduit 41 from the housing 40 which surrounds the cabin vent valve 39. The air passes through the conduit 41 and past the screen 42 into the throat of the combustion chamber 36 at which point the gasoline delivered by the pump 65 is sprayed into the moving air stream and is ignited by the igniter or spark plug 37. The combustion products pass through the valve 32, which is at that time in the position shown in Fig. 1, and passing through the passages 33, 34 in the valve, enter the heat exchanger 13 through the connection 30, and after passing through this heat exchanger discharge through the opening 21 into the passage 25 in the valve 23, which also occupies the position shown in Fig. 1, and then pass through the passage 24, also in the valve 23, to the connection 27, where the products of combustion flow through the conduit 28 to operate the rotors of the motor which drives the fuel pump, and the valve 56 controls the exhaust from these rotors to atmosphere. By more or less opening or closing the communication of the exhaust chamber 55 with the exhaust passage 57, the speed of operation of the pump operating motor will be regulated in accordance with the cabin temperature conditions under the control of the thermostatic control device 73, the position of the valve 56 being controlled by the bellows 71 whose degree of expansion is governed by the thermostat 73 in the cabin. The valve 56, by controlling the motor exhaust, governs the temperature of the cabin by controlling the flow of the combustion products through the conduit 28 to the motor, and it will be evident that, when the cabin is relatively warm, there will be little or no exhaust fluid passing the valve 56, and accordingly little or no combustion products driving the fuel pump, and so little or no combustion. When, however, the cabin is cold, the valve 56 will be relatively wide open and the fuel pump will be driven fast and a relatively considerable amount of heat will be produced by the combustion of the substantial amounts of gasoline burning and accordingly the warming up of the cabin will be augmented.

When the valves 23 and 32 are in the position shown in Fig. 1, the circuit to the igniter (spark plug) is closed, and, as the valve 56 will be partially opened under the control of its temperature responsive control device 73, cabin air will flow, when the valves 23 and 32 are in the positions to permit this, to the combustion chamber, and the exhaust combustion products will flow through the conduit 28 to the motor intake to drive the fuel pump and cause the pumping of the gasoline at a rate proportional to the cabin temperature deficiency to the nozzle 38 just beyond which it will be ignited. It will be obvious that the amount of air provided will be in proper proportion to the quantity of gasoline pumped and burned, and accordingly proper combustion will be maintained, and the heat exchange in the exchanger 13 and the quantity of heat transmitted to the air entering the cabin will be such that the cabin temperature will be held close to the desired limit. Naturally the control of the valve 56 will be such that this valve will be closed and the fuel pump stopped when a cabin temperature exists at which a thermostatic switch device, described in the above mentioned copending application, will effect shifting of the valves 23 and 32 clockwise through 90° from the position shown in Fig. 1. Since the igniter will always be in operation when the valves 23 and 32 are in the position shown in Fig. 1, an intermittent supply of fuel will not be dangerous if it occurs.

As a result of this invention an improved fuel pump is provided, especially designed to use in the aircraft cabin pressure conditions controlling field, whereby the temperature of the cabin is regulated in an improved manner. By the provision of the improved structure disclosed, the motor which drives the fuel pump derives its source of operating fluid from the combustion products discharged from the heating device. It will also be evident that by using cabin air to provide a sealing zone within the fuel pumping unit, the escape of the products of combustion from the motor to other portions of the pumping apparatus is prevented. These and other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. Heating mechanism for an aircraft cabin comprising, in combination, a housing having opposite end chambers and a chamber located between said end chambers, fluid actuated rotors received within one of said end chambers, shafts supporting said rotors and extending through each of the other chambers, bearings within the other end chamber for rotatably supporting said shafts, a heat exchanger for heating air supplied to the cabin, means for supplying air from the cabin through said heat exchanger to said rotors for operating the latter, a fuel burner arranged in said last mentioned means, a pump connected in driven relation with said rotors for supplying fuel to said burner, and means for supplying air from the cabin to said chamber between said end chambers.

2. In combination, a housing having opposite end chambers and a chamber located between said end chambers, fluid actuated rotors received within one of said end chambers, shafts extending through each of the other chambers and supporting said rotors, bearings within the other end chamber for rotatably supporting said shafts, fluid supply and discharge means for the one of said end chambers containing said rotors, and means for supplying to said chamber between said end chambers a fluid under a pressure at least equal to the pressure in the chamber containing said rotors.

3. In combination, a housing having opposite end chambers and a chamber located between said end chambers, fluid actuated rotors received within one of said end chambers, shafts extending through each of the other chambers and supporting said rotors, bearings within the other end chamber for rotatably supporting said shafts, gears connected to the portions of said shafts extending through the latter end chamber and meshing with each other for maintaining the correct angular relation between said rotors, fluid supply and discharge means for the one of said end chambers containing said rotors, and means for supplying to said chamber between said end chambers a fluid under a pressure at least equal to the pressure in the chamber containing said rotors.

4. In combination, a housing providing a gear casing at one end thereof and a motor casing at the other end thereof, fluid actuated rotors in said motor casing, a fuel pump supported by said housing at the first mentioned end thereof and operatively connected to said rotors, gearing in said gear casing operatively connected to said rotors for maintaining the latter in the correct angular relationship, and a sealing chamber between the gear casing and the motor casing having communication with a source of pressure fluid at least equal in its pressure to the motor operating fluid.

5. Heating apparatus for an aircraft cabin comprising, in combination, a heat exchanger having a course for air entering an aircraft cabin, a course for air leaving the cabin on its way to the surrounding atmosphere, a fuel burner, means including a combustion chamber in which said burner is disposed arranged to deliver air from the cabin to said second course, a fuel pump connected to deliver fuel to said burner, driving means for said fuel pump including a motor comprising a housing having opposite end chambers and an intermediate chamber, shafts having portions in each of said chambers, journal means for said shafts located wholly in one of said end chambers, bladed rotors in the other of said end chambers and supported by said shafts, means for delivering to said rotors air leaving the cabin after passing through said second course, and means for delivering to said intermediate chamber air coming directly from the cabin.

6. In combination, a housing having opposite end chambers and a chamber located between said end chambers, at least one fluid actuated element received within one of said end chambers, shaft means for supporting said element for rotation extending through each of the other chambers, bearing means within the other end chamber for rotatably supporting said shaft means, a source of fluid under pressure, conduit means connecting said source to the one of said chambers in which said fluid actuated means is received, independent conduit means extending from said source to said chamber located between said end chambers, and means in the first mentioned conduit means for the combustion of fuel therein.

7. In combination, a housing having opposite end chambers and a chamber located between said end chambers, at least one fluid actuated element received within one of said end chambers, shaft means for supporting said element for rotation extending through each of the other chambers, bearing means within the other end chamber for rotatably supporting said shaft means, a source of fluid under pressure, conduit means connecting said source to the one of said chambers in which said fluid actuated means is received, independent conduit means extending from said source to said chamber located between said end chambers, means in the first mentioned conduit means for the combustion of fuel therein, and pump means driven by said shaft means for delivering fuel to said fuel combustion means.

WIN W. PAGET.

REFERENCES CITED

The following references are of record in the file of this patent:

UNITED STATES PATENTS

| Number | Name | Date |
| --- | --- | --- |
| 890,764 | Geare | June 16, 1908 |
| 1,433,733 | Lindsay | Oct. 31, 1922 |
| 1,437,282 | Twombly | Nov. 28, 1922 |
| 1,437,283 | Twombly | Nov. 28, 1922 |
| 1,470,484 | Rockwell | Oct. 9, 1923 |
| 1,635,006 | Oliver | July 5, 1927 |
| 1,656,867 | Porsche | Jan. 17, 1928 |
| 2,014,932 | Hallet | Sept. 17, 1935 |
| 2,122,280 | Diedrich | June 28, 1938 |
| 2,153,379 | Lucas | Apr. 4, 1939 |
| 2,155,460 | Wishart | Apr. 25, 1939 |
| 2,188,752 | Houghton | Jan. 30, 1940 |
| 2,364,458 | McCollum | Dec. 5, 1944 |

FOREIGN PATENTS

| Number | Country | Date |
| --- | --- | --- |
| 311,503 | Germany | 1916 |